United States Patent Office 3,469,441
Patented Sept. 30, 1969

3,469,441
METHODS OF MEASURING STRAIN
Herbert Ackland Pohl, Uppsala, Sweden, assignor to Sci-Tech Corporation, Princeton, N.J., a corporation of New Jersey
No Drawing. Continuation-in-part of application Ser. No. 192,967, May 7, 1962. This application July 21, 1964, Ser. No. 384,249
Int. Cl. G01n 27/02
U.S. Cl. 73—88.5                    6 Claims

ABSTRACT OF THE DISCLOSURE

A process of measuring changes in strain which comprises the step of determining the change in resistance on a change of strain applied to a molded, microscopically-homogeneous, electronically-conductive, eka-conjugated, covalently bonded, polymeric, organic molecular solid having a specific conductivity between about $10^{-12}$ and $10^{+3}$ mhos per centimeter at 25° C. and a molecular weight of over 500.

---

This invention relates to a process of measuring strains by changes in resistivity of homogeneous electronically-conductive molecular solids having a specific conductivity between about $10^{-12}$ and $10^{+3}$ mhos per centimeter at 25° C. The invention also relates to pressure-sensitive molded homogeneous, electronically-conductive molecular solids having a specific conductivity between about $10^{-12}$ and $10^{+3}$ mhos per centimeter at 25° C.

It is well known that changes in strains may be measured by strain gauges prepared from resistance wire or other metallic wire materials which change their electrical resistance as pressure is applied. However, the amount of change of resistivity over the desired range of strain does not generally exceed about 4% and an extreme maximum of 30% seems to be the upper limit, when measuring extreme strains, in practice. It is also known that changes in strain may be determined by resistivity changes of such materials as carbon granule compactions. An example of this type of strain measurement is the ordinary carbon button microphone. However, the reproducibility or reliability of the carbon granule compaction type of strain gauge is very low while that of the metallic strain gauge is quite high. Metallic pressure or strain gauges utilizing the 4% change in resistivity with strain are therefore commonly employed in place of the carbon granule type of gauge.

This application is a continuation-in-part of my co-pending application United States patent application Ser. No. 192,967, filed May 7, 1962, now abandoned.

An object of the present invention is to develop a method of measuring changes in strain by the change in resistivity of a homogeneous, electronically-conductive molecular solid having a specific conductivity between about $10^{-12}$ and $10^{+3}$ mhos per centimeter at 25° C. and molded into one piece corresponding to a single crystal size or larger.

Another object of the present invention is to obtain a strain-sensitive, molded, homogeneous, electronically-conductive molecular solid having a specific conductivity between about $10^{-12}$ and $10^{+3}$ mhos per centimeter at 25° C.

These and other objects of the invention will become more apparent as the description thereof proceeds.

I have found that a certain class of semi-conductors which are essentially molded, homogeneous, electronically-conductive, molecular solids having a specific conductivity between about $10^{-12}$ and $10^{+3}$ mhos per centimeter at 25° C. possess a large coefficient of resistance with changes in strain without any hysteresis effect. These materials, when molded into one piece, corresponding to a single crystal size or larger, change in resistance some 10,000% or more, as compared with the conventional resistance wire which changes in resistivity some 4% over the same range of strains.

Due to this large change in resistivity with changes in strain, the molded semi-conductors of my invention are useful for all purposes where a measurement of changes in applied strain is desired. Because these products have roughly 100 times greater electrical response for a given applied strain, as compared with ordinary resistance wire, they can be utilized without extensive magnification of the electrical signal output and signals are obtained without amplification which cause large scale motions on rather crude electrical instruments such a milliammeters. The molded semi-conductors of my invention can be utilized directly, for example, as the pressure sensitive element in a barometric pressure gauge, a distortion gauge, a sonic transducer, or a strain gauge.

As stated previously, the strain-sensitive materials are molded, homogeneous, electronically-conductive, molecular solids having a specific conductivity between about $10^{-12}$ and $10^{+3}$ mhos per centimeter at 25° C. A molecular solid is a material comprised of a number of molecules wherein the atoms forming the molecules may be bonded by the usual covalent bonds, which may be either regular covalent bonds or dative covalent bonds, or by ionic bonds or by metallic bonds, but at least 10% or more of the atomic distances are not those of ionic, metallic or covalent bonds but rather Vanderwaal's distances or distances of the Vanderwaal's type, as between molecules. Where ordinary covalent bonds, for example, are about 1.5 angstroms in length, Vanderwaal's bonds are longer, about 3.5 angstroms in length. It is probable that this relatively large number of Vanderwaal bond distances in the molecular solids of my invention are what makes the material very responsive to strains. In the individual molecules of the electrically-conductive polymers of the invention, electronic conduction is relatively easy. However, the conduction is partially blocked by the large separation between the molecules by the Vanderwaal's distances. It is believed that the application of strain effects the Vanderwall's distances in the molecular solid thus radically changing the conductivity of the molecular system.

Among the class of molecular solids which are homogeneous and electronically-conductive with a specific conductivity between about $10^{-12}$ and $10^{+3}$ mhos per centimeter at 25° C., I prefer those molecular solids which are polymeric and preferably those which are microscopically homogeneous. These compounds can be either inorganic or organic polymers. The term "electronically-conductive" excludes those molecular solids which conduct electrolytically or ionically. The term "homogeneous" excludes materials containing metallic or other conductive material lumps as (inhomogeneous) fillers.

Of the preferred class of microscopically-homogeneous, electronically-conductive, organic polymer, molecular solids having a specific conductivity between about $10^{-12}$ and $10^{+3}$ mhos per centimeter at 25° C., it has been noted that it appears important that the large organic molecules possess a characteristic described as "eka-conjugation." A molecule is said to be eka-conjugated if the number of alternate single and multiple bonds is so large that the molecule exists in electronically excited states to an appreciable degree (greater than $10^{-12}$ mol fraction) at room temperature. These eka-conjugated molecules with their large number of loosened electrons are prone to conduct electronically. A fundamental parameter is found to be the size of the planar structures of which the molecular solid is composed. The piezo-conductivity and enhanced electronic properties are best exhibited in those substances possessed of conjugation carried to a superlative degree, i.e. to what is known as eka-conjugation. The extent of potential eka-conjugation is considered to be proportional to the number of consecutive pi-electron orbitals in the structure; the degree of potential eka-conjugation is considered to be proportional to the coupling between successive pi-electron orbitals.

These eka-conjugated molecules when formed into molecular solids, preferably by a molding operation, either by themselves, or perhaps with common molding additives, can be referred to as microscopically-homogeneous, electronically-conductive, organic polymer molecular solids having a highly conjugated molecular structure and a specific conductivity between about $10^{-12}$ and $10^{+3}$ mhos per centimeter at 25° C.

The highly conjugated organic polymers of the above class are covalently bonded or ionically bonded, such as the TCNQ polymers (tetracyanoquinodimethane polymers) reported by Kepler et al., Phys. Rev. Letters, 5, 503–4 (1960). The covalently bonded polymers can be bonded in regular covalency, such as the polyacetylene polymers, or in dative covalency, such as the molecular complexes of pyrene-iodine polymers or ferrocene polymers. The eka-conjugated organic polymers are primarily of the regular covalent type.

Examples of the type of polymers utilized in the invention are the following:

(A) COVALENTLY BONDED TYPE (1) The so-called PAQR or poly acene quinone radical polymers.—These PAQR polymers are produced by polymeric condensation of aromatic hydrocarbons or substituted aromatic hydrocarbons with carboxylic acid derivatives, preferably aromatic hydrocarbon polycarboxylic acid derivatives by a Friedel-Crafts type of reaction. The condensation may be accomplished, for example, by the use of certain catalysts such as zinc chloride, aluminum chloride, phosphoric acid or sulfuric acid at temperatures from room temperature up to 400° C. A preferred temperature of operation, for example, for aluminum chloride catalyzed polymers would be between about room temperature and about 100° C. For the zinc chloride catalyzed polymers it is from 250° C. to 306° C. although temperatures up to 450° C. may be used.

(2) The Schiff's base polymers.—These polymers are prepared by the well known organic chemical reactions using difunctional monomer pairs such as those of quinones and aromatic diisocyanates as described by Pohl et el., Papers Presented at the Chicago Meeting, September 1961, Amer. Chem. Soc. Div. of Polymer Chemistry, 2, No. 2, 150–60 (1961). These polymers are also known as quinazone polymers.

(3) The polyacetylene polymers.—These polymers are prepared by polymerizing aromatic acetylenes as described by Berlin, Khim. Teknol. Polymerov., 7–8, 193–58 (1960) [Translation in English, Standard Oil Co. (Ind.) Information Div., Translation TRO 60–122].

(4) The polyacene polymers such as poly-phenyl and the like, or violanthrene.—These polymers are prepared by reacting a polyhalogenated aromatic compound in a Wurtz-Fitting type reaction as described by Edwards et al., J. Polymer Sci., 16, 589 (1955).

(5) Polymers prepared by sulfurizing or vulcanizing aromatic hydrocarbons with sulfur at elevated temperatures on the order of 100° to 400° C.

(6) Polythioether polymers.—These polymers are prepared by condensing a polyhalogenated aromatic thiol in the presence of a strong base such as molten potassium hydroxide as described by Pohl, "Semiconduction in Polymers, a Review," Princeton Univ. Plastics Lab. Techn. Report No. 61D (1961).

(7) The polyphthalocyanine polymers.—These polymers are formed by heating tetracyanobenzene in contact with a heavy metal such as copper or iron.

(8) The polyferrocene carbonyl or the ferrocene ketone polymers.—These polymers contain ferrocene groups linked by carbonyl groups and are described by Pohl, ibid., and by Mette et al., Bull. Amer. Phys. Soc. II, 6, 294 (1961).

(B) DATIVELY BONDED "INFINITE ORDER" COMPLEXES (1) Pyrene-iodine, formed by precipitation from a solution of pyrene in benzene and a solution of iodine in benzene.

(2) The polyferrocene carbonyl or ferrocene ketone polymers (A–8 above) may alternately be considered of this type.

In addition to the macromolecules of the above types, it is also observed that certain smaller but highly aromatic molecules of molecular weight over 500 can be made to serve the invention. For example, nickel phthalocyanine, or violanthrone.

The following examples are given to illustrate the invention.

It is to be understood that other procedures known to those skilled in the art may be employed without departing from the invention.

Example I

Equimolar amounts of anthracene with pyromellitic dianhydride were mixed in a mortar. About 2 mols of zinc chlorides as catalysts, were added for every mol of acid anhydride. After a thorough mixing of the components, they were placed in a glass-lined reaction chamber and heated to a temperature between about 256° and 306° C. The heating was continued for about 24 hours.

At the completion of polymerization, the polymer was ground to a fine powder. The material was leached with dilute hydrochloric acid for 12 hours to aid in removing the zinc chloride catalyst. Subsequent to the leaching, the powder was extracted with water for 12 hours, ethanol for 24 hours and benzene for 12 hours in a Soxhlet apparatus. The polymer was then dried at 50° C. for 12 hours. After drying, the material was again finely ground and stored in a desiccator until evaluations were to begin.

The polymer was then molded at a temperature of 125° C. and a pressure of from 1850 to 2000 kg./cm.$^2$ to give a small round disc.

The resistivity was determined by placing the molded samples between circular electrodes 0.95 cm. in diameter, faced with platinum. Several materials were used for the surrounding insulator ring, including nylon, Nylatron, hard rubber, Teflon and filled phenolics. In each case the resistance value of the cell was checked using several layers of mica in the cell in place of the sample, to ascertain that the cell insulator and supports had a resistivity at least 100 times greater than the sample measured. The resistance was obtained using D.C. methods with a field strength of 150 volts/cm. or less. Thickness measurements were made using a dial micrometer. The resistivity measurements were also made using Bridgeman anvils made of stainless steel or of tungsten carbide alloy.

At a pressure of 5000 atmospheres, the anthracene-pyromellitic anhydride polymer disc has a resistance of $2 \times 10^5$ ohms at 25° C. (Specific resistivity=$2.2 \times 10^{-7}$ mho/ch.) At a pressure of approximately 40,000 atmospheres, the resistance dropped to approximately $2 \times 10^2$ ohms, a change in resistance of about a thousandfold. Recycling of the pressure cycle did not change the indicated values once the material had been fully compacted. The resistivities were uncorrected for the unknown change in sample thickness with pressure (compressibility). However, the resistance changes, at least in the high pressure range, were large and quite reversible. The reversible drop in resistivity of about a thousandfold during the pressure cycle of 5000 to 40,000 to 5000 atmospheres greatly exceeds that which might be expected from gross dimensional changes which were minor.

Similarly, polymers from other starting compounds were prepared according to the above technique for preparation of PAQR polymers and their values are reported in table below.

TABLE

| | Composition | | Resistance in ohms | |
|---|---|---|---|---|
| Ex. | Aromatic hydrocarbon | Aromatic polycarboxylic derivative | 5,000 atm. pressure | 40,000 atm. pressure |
| I | Anthracene | Pyromellitic anhydride | $2 \times 10^5$ | $2 \times 10^2$ |
| II | Triphenylchloromethane | do | $3 \times 10^{12}$ | $3 \times 10^{10}$ |
| III | Terphenyl | do | $5 \times 10^5$ | $5 \times 10^3$ |
| IV | Pyrene | do | $1 \times 10^3$ | $2 \times 10$ |
| V | 1-hydroxyanthraquinone | 1,8-naphthalic anhydride | $3 \times 10^4$ | $5 \times 10^2$ |

Example VI

A Schiff's base polymer formed by condensing 1,4-naphthaquinone with 1,4-phenylene diisocyanate was molded similarly to Example I and its resistance with pressure change was likewise determined. At a pressure of 5000 atmospheres it had a resistance of $2 \times 10^9$ ohms and at a pressure of 40,000 atmospheres it had a resistance of $2 \times 10^7$ ohms, a change of roughly a hundredfold.

Other compounds which, in the form of molecular solids, have been tested in like manner and show large changes in resistance with changes in pressure, with complete reversibility of resistance effects on restoration to the original test pressures are:

(a) Polytetrachlorothiophenol having a resistance of 1000 ohms at 5000 atmospheres and 20 ohms at 40,000 atmospheres;

(b) Polymers made by condensing pyromellitic dianhydride with halogenated acids, such as chloroacetic acid. Similar piezo-resistive behavior was observed. Its resistance was 20 ohms at 5000 atmospheres and 2 ohms at 40,000 atmospheres.

A simple scale can be produced by utilizing one of the molded discs, say from Example I, as one of the resistors in a Wheatstone bridge circuit. A loading of as little as 1 gram will cause a deflection of the needle of the milliammeter. It is obvious the molecular solids of my invention can be substituted for other types of strain sensing elements in strain gauges.

The preceding specific embodiments are illustrative of the invention. They are not, however, to be deemed limitative.

I claim:

1. A process of measuring changes in strain which comprises the step of determining the change in resistance on a change of strain applied to a molded poly acene quinone radical high molecular weight polymer having a specific conductivity between about $10^{-12}$ and $10^{+3}$ mhos per centimeter at 25° C. and a molecular weight of over 500.

2. The process of claim 1 wherein said molded poly acene quinone radical high molecular weight polymer is a molded anthracene pyromellitic anhydride polymer.

3. The process of claim 1 wherein said molded poly acene quinone radical high molecular weight polymer is a molded triphenylchloromethane pyromellitic anhydride polymer.

4. The process of claim 1 wherein said molded poly acene quinone radical high molecular weight polymer is a molded terphenyl pyromellitic anhydride polymer.

5. The process of claim 1 wherein said molded poly acene quinone radical high molecular weight polymer is a molded pyrene pyromellitic anhydride polymer.

6. The process of claim 1 wherein said molded poly acene quinone radical high molecular weight polymer is a molded 1-hydroxyanthraquinone 1,8-naphthalic anhydride polymer.

References Cited

UNITED STATES PATENTS

| 2,621,276 | 12/1952 | Howland | 117—201 X |
| 2,632,062 | 3/1953 | Montgomery | 179—121 |
| 2,880,497 | 4/1959 | Hall | 73—35 X |

OTHER REFERENCES

McNeill et al., "A Xanthene Polymer With Semi-Conducting Properties," article in Australian Journal of Chemistry, vol. 12 (1959), pp. 643–656.

"Organic Conductors Research," article in Chemical and Engineering News, Feb. 26, 1962, pp. 86–90, 94 and 95.

RICHARD D. LOVERING, Primary Examiner

U.S. Cl. X.R.

73—398; 252—500; 338—2